United States Patent
Tyson

[11] Patent Number: 6,014,916
[45] Date of Patent: Jan. 18, 2000

[54] TWO PART PINION PIN FOR A DIFFERENTIAL ASSEMBLY

[75] Inventor: Mark V. Tyson, Newport Beach, Calif.

[73] Assignee: Vehicular Technologies, Inc., Costa Mesa, Calif.

[21] Appl. No.: 09/073,114

[22] Filed: May 5, 1998

[51] Int. Cl.[7] ................................................ F16H 48/12
[52] U.S. Cl. ............................ 74/650; 475/230; 475/346
[58] Field of Search .............................. 74/650; 475/230, 475/231, 346

[56] References Cited

U.S. PATENT DOCUMENTS 4,182,201  1/1980  Mayhew et al. ........................ 475/230
5,603,246  2/1997  Zentmyer .................................. 74/650

Primary Examiner—Khoi Q. Ta
Attorney, Agent, or Firm—Blakely, Sokoloff, Taylor & Zafman LLP

[57] ABSTRACT

One embodiment of the present invention is a differential assembly which includes a two part pinion pin that allows the pinion pin to be removed for parts service and/or replacement without removing the differential case and ring gear from the differential housing. In differentials in which the ring gear interferes with the removal of the pinion pin, the two part pinion pin allows removal of the pinion pin in two pieces, each being rotated about its axis for insertion or removal to provide the best position for clearance with the ring gear. The two part pinion pin may be advantageously used with differentials of various kinds.

22 Claims, 7 Drawing Sheets

TWO PART PINION PIN FOR A DIFFERENTIAL ASSEMBLY

BACKGROUND OF THE INVENTION

1. Field of the Invention

The present invention relates to differential assemblies for vehicles such as automobiles.

2. Background Infomation

Automobiles include differential assemblies to compensate for different wheel speeds when the vehicle moves in a non-linear path. For example, when an automobile is turning to the left or right, the radially inward wheels rotate at a speed that is lower than the speed of the outer wheels. The differential assembly allows different rotational speeds of the drive wheels when the vehicle is in a turn.

There have been developed various types of differential member assemblies including a product sold by Vehicular Technologies, Inc. of Costa Mesa, California under the trademark "Performance Locker" for improving traction. The Performance Locker automatic positive-locking differential fits within a differential case and couples to the drive axles of the vehicle, the differential case having a ring member fastened thereto driven in rotation by a pinion member on the drive shaft of the vehicle. The Performance Locker differential includes a pair of drive members that engage a pair of coupler members through facing, inclined teeth. The coupler members are attached to the wheel axles. The drive members are coupled for rotation by the differential case by the differential pinion pin. Rotation of the vehicle drive shaft is translated to the wheel axles through the ring gear, case, pinion pin, drive members and mating coupler members.

The pinion pin loosely fits within a pair of grooves in the side of each drive member opposite the inclined teeth. The grooves have inclined sides, with a width that is greater than the diameter of the pinion pin. When the vehicle is being powered or braked by the vehicle engine, the pinion pin will be rotated about an axis perpendicular to the axis of the pinion pin to engage and drive one, or both (particularly when the drive wheels of the vehicle are on a slippery or soft surface) drive members to transfer the torque of the drive member to the respective coupler member. When the vehicle proceeds around a curve, one of the drive wheels rotates at a different speed than the other wheel. The different speed initially causes the drive member associated with the faster wheel, if the engine is powering the vehicle, or the slower wheel if the engine is retarding the vehicle, to rotate away from contact with the pinion pin. This allows the drive member to move axially away from the respective coupler member if so encouraged.

The drive and coupler members each have inclined teeth on the adjacent faces thereof. When the edges of the grooves in a drive member move away from the pinion pin within the limit of rotation of one drive member with respect to the other drive member, the drive member teeth climb and slide over the respective coupler member teeth so that the wheels can rotate at different speeds. Springs in the assembly bias each drive member into full engagement with the respective coupler member when the teeth on the drive member and coupler member realign.

In some differential assemblies, particularly for high ring gear/pinion gear ratios, the pinion pin cannot be removed with the ring gear in position because of interference of the ring gear teeth with the pinion pin axial movement. By way of example, the pinion pin in the Ford 7.5 inch (ring gear diameter) can be shifted axially so as to allow removal of the C clip holding the axle in position for axle removal, but the pinion pin cannot be fully removed without disassembly of the differential case bearing caps and then removal of the ring gear from the case. This in turn requires a skilled mechanic to re-setup the ring and pinion gear adjustment. Even once this is done, however, whether for installation and service of a locking differential, a conventional or a limited slip differential, it would be advantageous to be able to again service and/or replace cluster gears of a conventional differential, drive and coupler members of a locking differential, etc without having to repeat the entire differential disassembly and reassembly and gear setup process.

SUMMARY OF THE INVENTION

One embodiment of the present invention is a differential assembly which includes a two part pinion pin that allows the pinion pin to be removed for parts service and/or replacement without removing the differential case and ring gear. In differentials in which the ring gear interferes with the removal of the pinion pin, the two part pinion pin allows removal of the pin in two pieces, each being rotated about its axis for insertion or removal to provide the best position for clearance with the ring gear. The two part pinion pin may be advantageously used with differentials of various kinds.

DETAILED DESCRIPTION OF THE INVENTION

One embodiment of the present invention is a differential assembly which includes a two part pinion pin. In certain differentials, the ring gear interferes with the removal or replacement of the pinion pin, requiring the removal of the differential case from the differential housing and the removal of the ring gear from the differential case before the pinion pin may be removed or replaced. This in turn requires skillful re-setup of the ring gear and the pinion gear on the drive shaft for proper operation. The two part pinion pin, once installed in such a differential, allows the two part pin to be removed and differential parts to be replaced without removing the differential case or ring member of the assembly.

The differential assembly in a locking differential may include a coupler member that can be attached to a drive axle of a vehicle. The coupler member may be coupled to a drive member, the coupler member and the drive member being located within the inner cavity of the case. The ring member is attached to the case and engages a pinion gear on the drive shaft of the vehicle. The two part pinion pin couples the drive members to the case.

In certain differentials of the locking type described, the drive and/or coupler members can be replaced by initially installing the members into the case of the differential assembly. A first part of the two part pinion pin is then inserted into the pinion pin bore in the case at an angular orientation so as to clear the ring gear teeth and along a corresponding groove in the backside of a drive member. The first part of the two part pinion pin is then rotated 180° so that the second part of the two part pinion pin can be installed into the pinion pin bore at the same angular orientation for clearing the ring gear teeth as the first part was first inserted. The two part pinion pin is then attached to the case by a fastener. The first and second parts each have a width that is small enough to clear the space between the ring gear and the opening. Normally, the ring gear must be removed to install a pinion pin that does not have two part. The present invention thus allows the drive and/or coupler members to be replaced without removing the ring gear or differential case.

Figure 1:
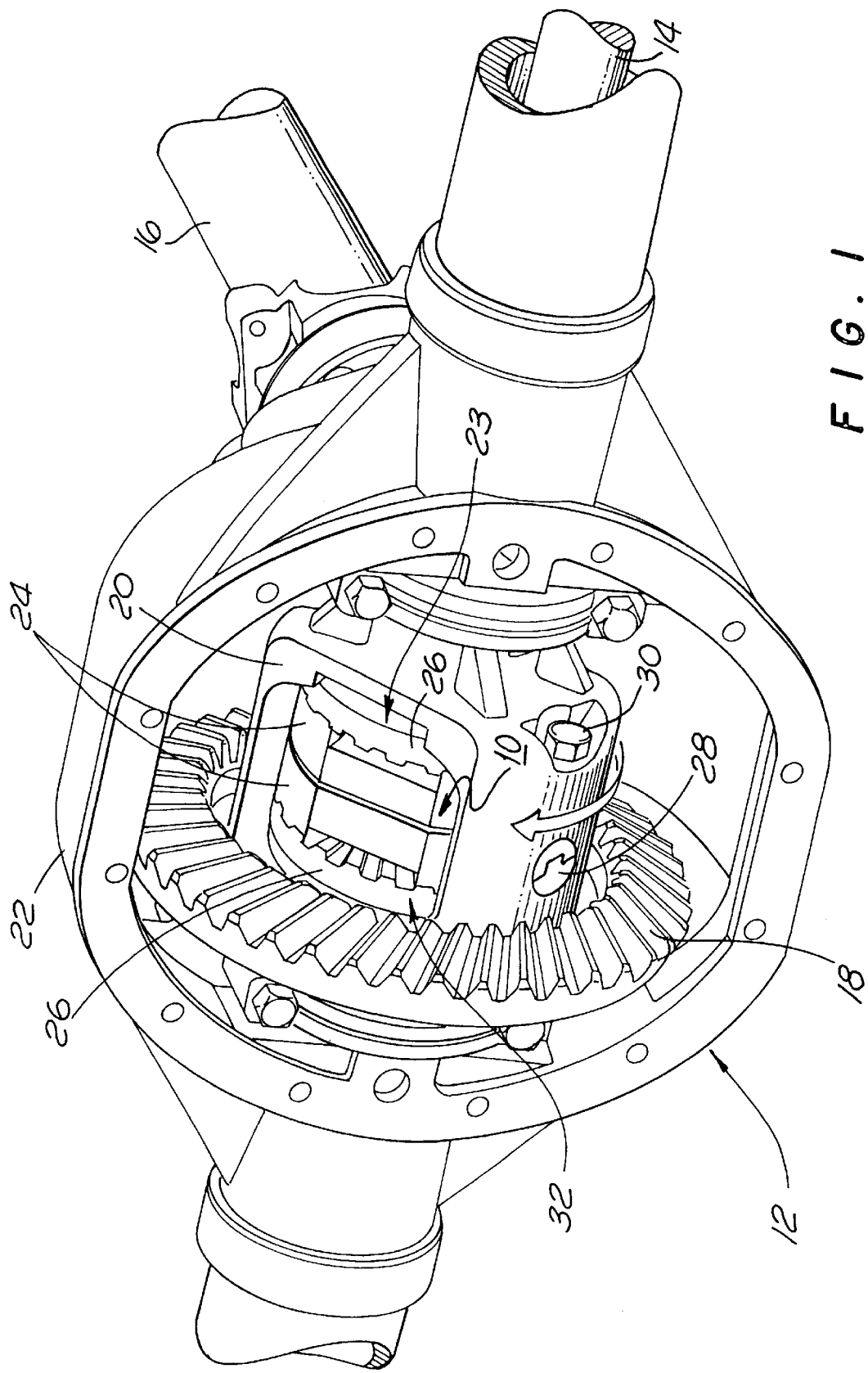
FIG. 1 is a perspective view of an embodiment of a differential assembly of the present invention.

Referring to the drawings more particularly by reference numbers, FIG. 1 shows an embodiment of a differential gear assembly 10 of the present invention incorporating a locking differential. The differential assembly 10 may be part of a rear drive train assembly 12 that is assembled into a vehicle such as an automobile. The rear drive train assembly 12 couples a pair of drive axles 14 to a drive shaft 16. The rear drive train assembly 12 translates rotation of the drive shaft 16 into a corresponding rotation of the drive axles 14 and the wheels (not shown) of the vehicle.

The rear portion of the drive shaft 16 may have a pinion gear (not shown) that engages ring gear 18. The ring gear 18 is attached to a case 20. The ring gear 18 and case 20 are enclosed by a housing 22. Rotation of the drive shaft 16 rotates the ring gear 18 and causes the case 20 to spin about the axis of the drive axles 14.

In this embodiment, the case 20 has an inner cavity 23 which contains a pair of drive members 24 that are mated with a pair of coupler members 26. The coupler members 26 are attached to the wheel axles 14. The drive members 24 are secured to the case 20 by a two part pinion pin 28 so that rotation of the case 20 causes a corresponding rotation of the members 24. When the members 24 and 26 are mated, rotation of the drive members induce a corresponding rotation of the coupler members 26 and the wheel axles 14. The two part pinion pin 28 is attached to the case 20 by a fastener 30.

In such a differential assembly, it may be desirable to replace the drive 24 and/or coupler 26 members, or by way of example, in a conventional differential of the type described, to replace one or more of the gears in the four gear cluster in the case. In a standard case of the type described, an opening 32 is provided in the case 20 to allow access thereto. However the pinion pin 28 must be removed and reinstalled to replace the members 24 and/or 26, cluster gears, etc. In accordance with the present invention, it is preferable to install the two part pinion pin 28, so that any subsequent servicing or replacement of such parts that may become necessary may be done without again removing and reinstalling the case and ring member 18.

Figure 2:
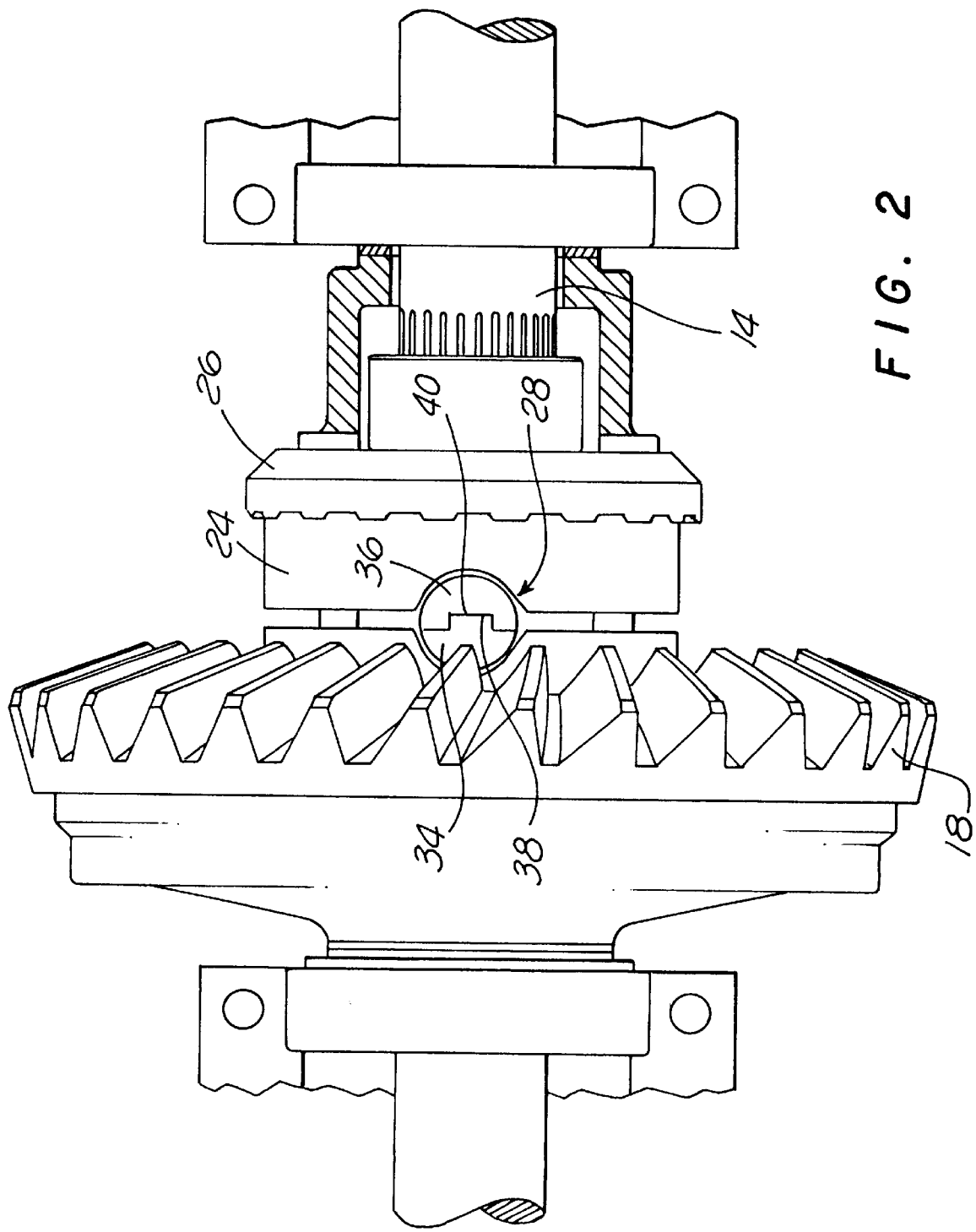
FIG. 2 is a side view of the assembly.

As shown in FIG. 2, the ring member 18 partially blocks the pinion pin 28. If the pinion pin 28 were solid, it could not be removed without detaching the ring member 18. The present invention provides the two part pin 28 which has a first part 34 and a second part 36. Each part 34 and 36 has a width that is small enough to allow each separate pinion pin part to be inserted into the pinion pin bore in the case 20 without interfering with the ring member 18. Thus the two part pinion pin 28 of the present invention can be removed and reinstalled without detaching the case and ring member 18. The second part 36 may have a groove 38 that receives a corresponding tongue 40 of the first part 34. The tongue 40 and groove 38 prevent relative movement between the parts in a radial direction and increase the stiffness and strength of the two part pin.

Figure 3:
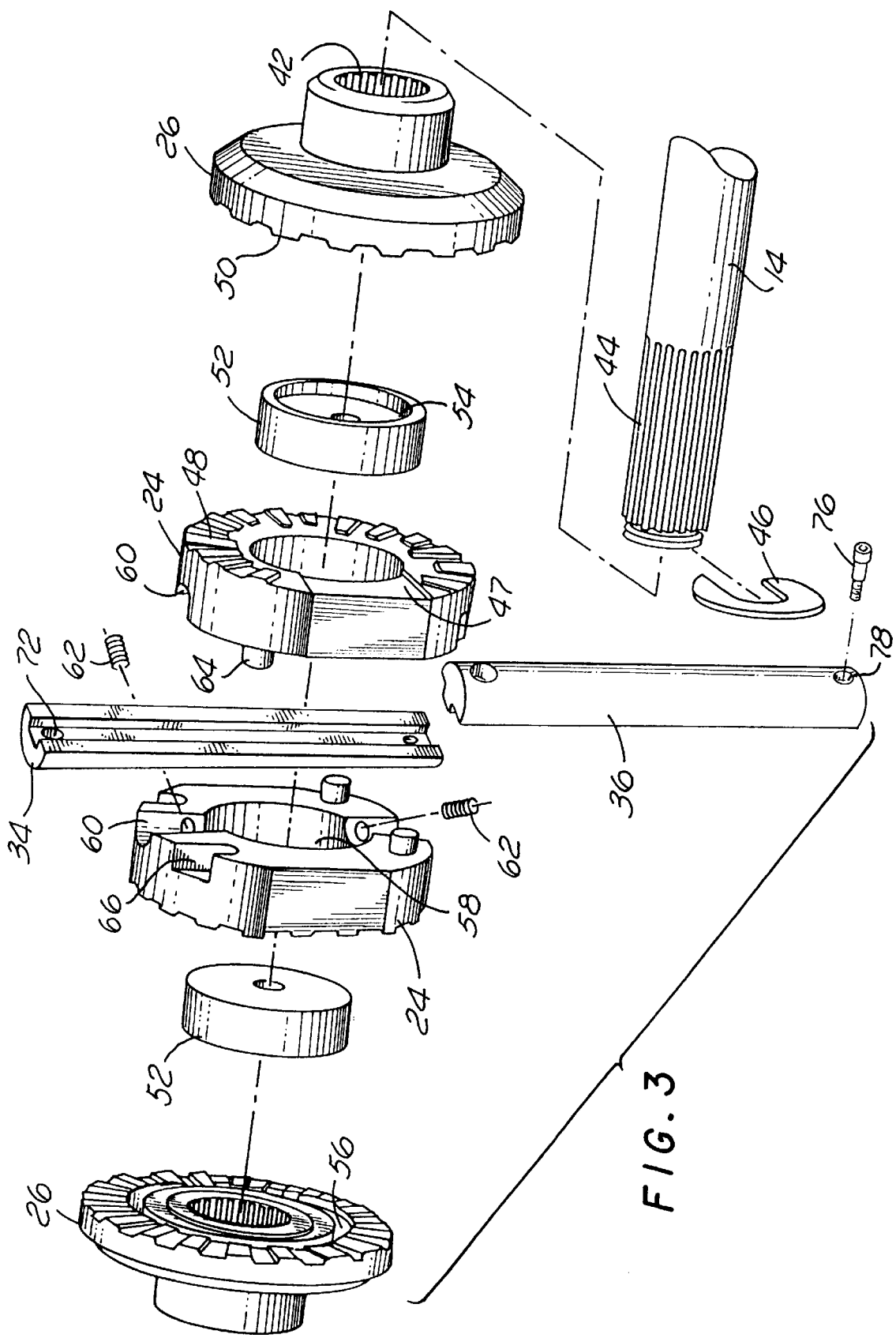
FIG. 3 is an exploded view of a portion of the assembly.
Figure 5:
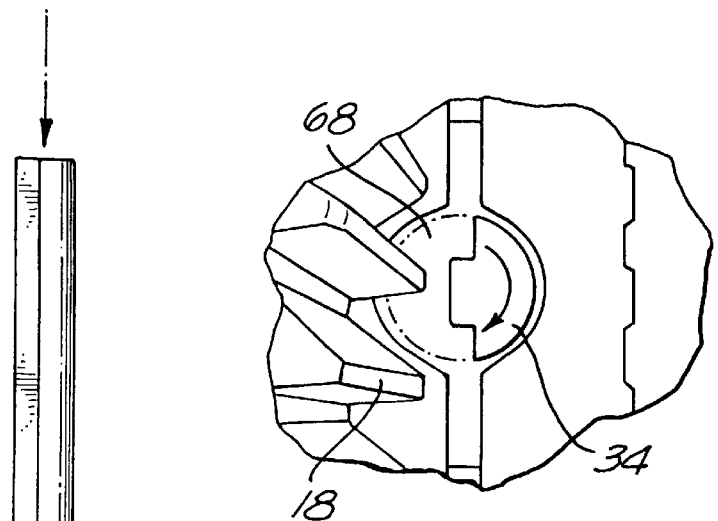
FIG. 5 is a top view showing the first part of the two part pin installed into the assembly.
Figure 4:
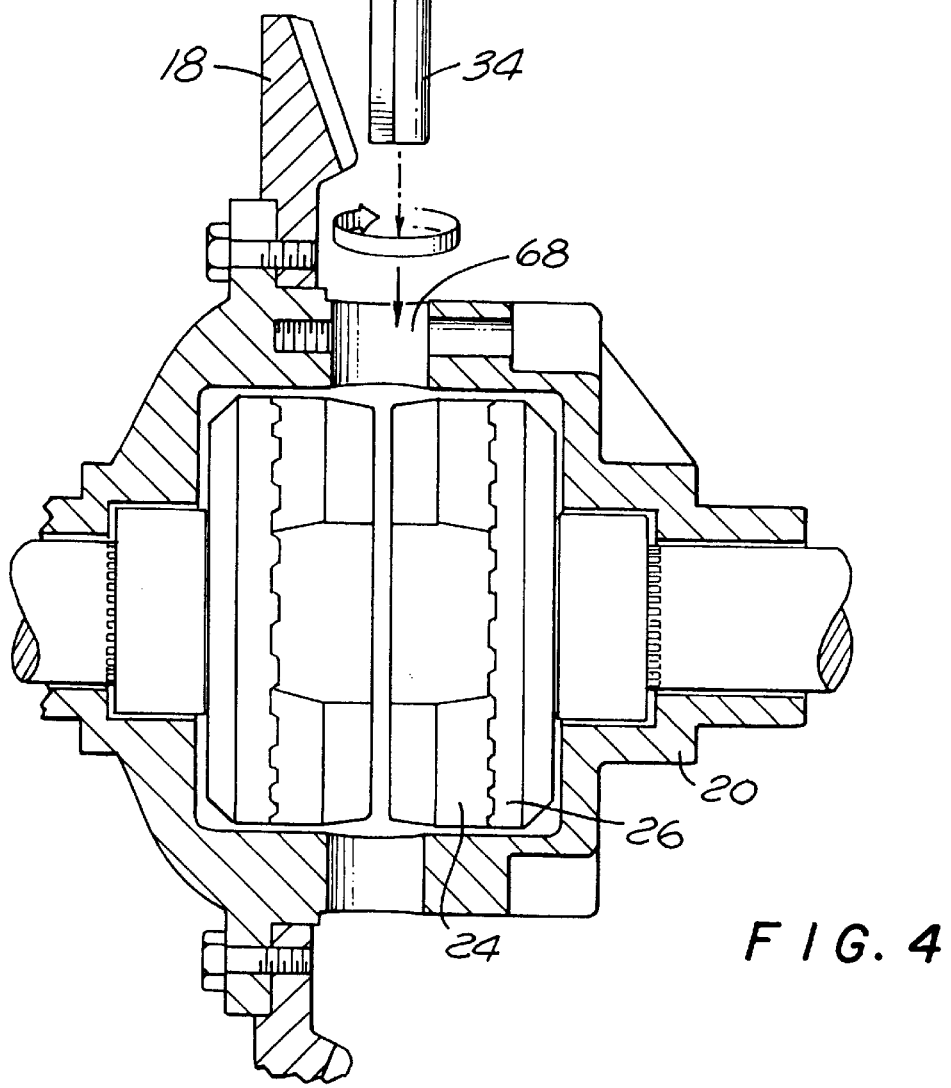
FIG. 4 is a side view showing a first part of the two part pin being placed into the assembly.

FIG. 3 shows various components of the differential assembly 10. The coupler members 26 each include a center splined bore 42 that receives a corresponding splined end 44 of a drive axle 14. On some differentials, the drive axle 14 is secured between the coupler member 26 and the two part pin by a C clip 46. Each drive member 24 may have a slot 47, or groove, which allows a clip 46 to be attached to an axle 14 during assembly. Other differentials do not use C clips 46, but instead secure the axles in the wheel assemblies at the opposite end of the axles. If a C clip 46 is not used, the drive member slot 47, or groove, is eliminated.

Each drive member 24 has a plurality of inclined teeth 48 that can mate with corresponding inclined teeth 50 of a coupler member 26. The assembly 10 may further have a pair of spacers 52 which align the drive members 24 with the coupler members 26. Each spacer 52 may have an annular lip 54 that is inserted into a corresponding annular recess 56 in the face of each coupler member 26. The spacers 52 extend into corresponding center openings 58 of each drive member 24.

The first 34 and second parts 36 of the two part pinion pin 28 extend along grooves 60 in the backface of the drive members 24. The assembly 10 may further have springs 62 which bias the drive members 24 toward the coupler members 26. The grooves 60 are larger than the two part pinion pin 28 so that under powering or engine retarding conditions, the pinion pin 28 is slightly rotated about the center line of the drive axles relative to one or both of the drive members 24 so that the pinion pin parts engage the drive member grooves 60 of one or both drive members to transmit power to the drive axle or axles.

When the wheels are rotating at different speeds, the two part pinion pin 28 rotates away from one of the drive members 24, providing clearance between the two part pinion pin and the drive member groove so that the drive member 24 can move axially away from the coupler member 26. The teeth 48 and 50 are inclined so that the drive member teeth 48 climb and slip past the coupler member teeth 50 to allow differential rotation between the wheel axles 14. The springs 62 push the drive member 24 back into engagement with the coupler member 26 when the axles are no longer rotating at different speeds. The drive members 24 may have mating pins 64 and grooves 66 which limit the relative rotation between the drive member 24 and the pinion pin 28. The operation of the differential member assembly is also discussed in U.S. Pat. No. 5,603,246 and U.S. Application Ser. No. 08/962,235 filed on Oct. 31, 1997, pending, assigned to the same assignee of the present invention, and hereby incorporated by reference.

Figure 7:
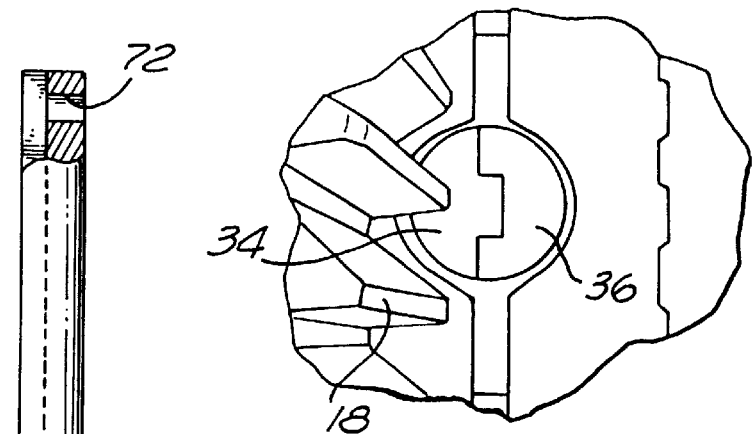
FIG. 7 is a top view showing the complete two part pin assembly installed into the differential assembly.
Figure 6:
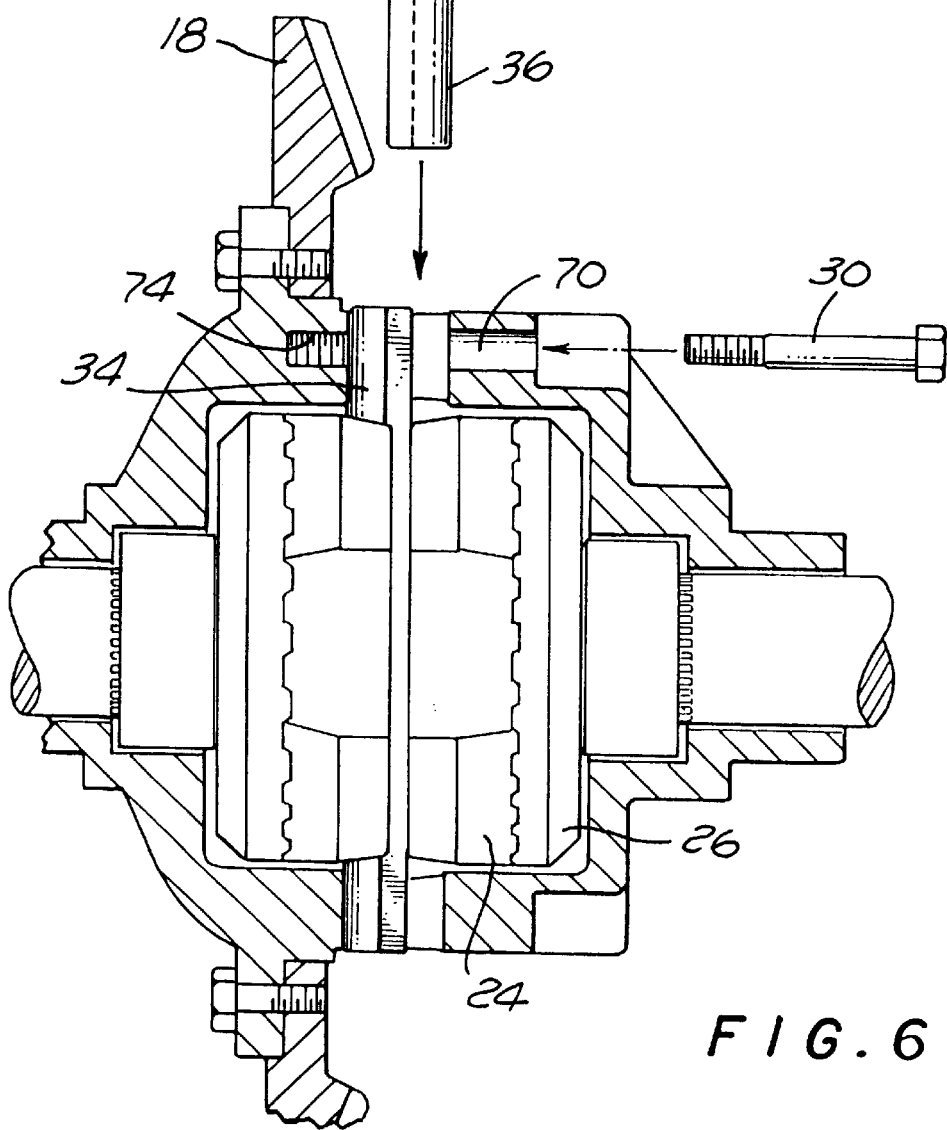
FIG. 6 is a side view showing a second part of the two part pin being inserted into the assembly.
Figure 8:
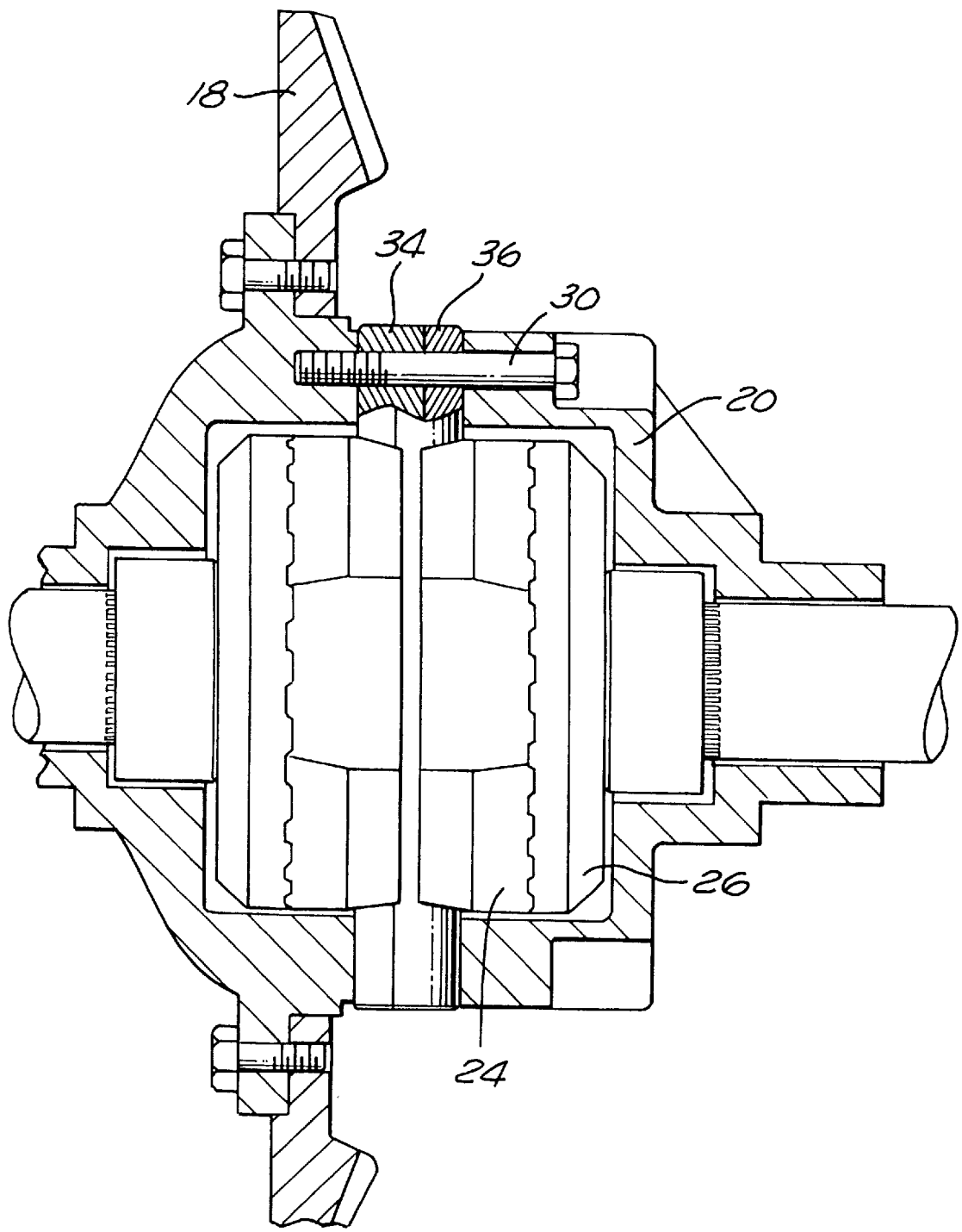
FIG. 8 is a side sectional view showing the two part pin being attached to a case of the differential assembly.

FIGS. 4–8 show the installation of the two part pinion pin parts 34 and 36. The drive member 24 and/or coupler 26 members have been installed into the inner cavity 23 of the case 20. The first pinion pin part 34 is initially inserted into a bore 68 of the case 20 and then rotated 180°. As shown in FIGS. 6 and 7, the second pinion pin part 36 is then inserted into the bore 68. Both pinion pin parts 34 and 36 have a width which allows the parts to clear the ring member 18 when installed into the bore 68. The fastener 30 is eventually pushed through a clearance hole 70 of the case 20, holes 72 and 78 in the two part pinion pin parts, and screwed into a threaded hole 74 of the case 20 to complete the assembly 10. In manufacturing, to accurately finish the diameter of the two part pinion pin 28, the pinion pin parts 34 and 36 may be attached together adjacent each end thereof by fastener 76 that extends through clearance holes 78 in the pinion pin part 36 and screws into threaded hole 72 in pinion pin part 34 and as shown in FIG. 3.

Figure 9:
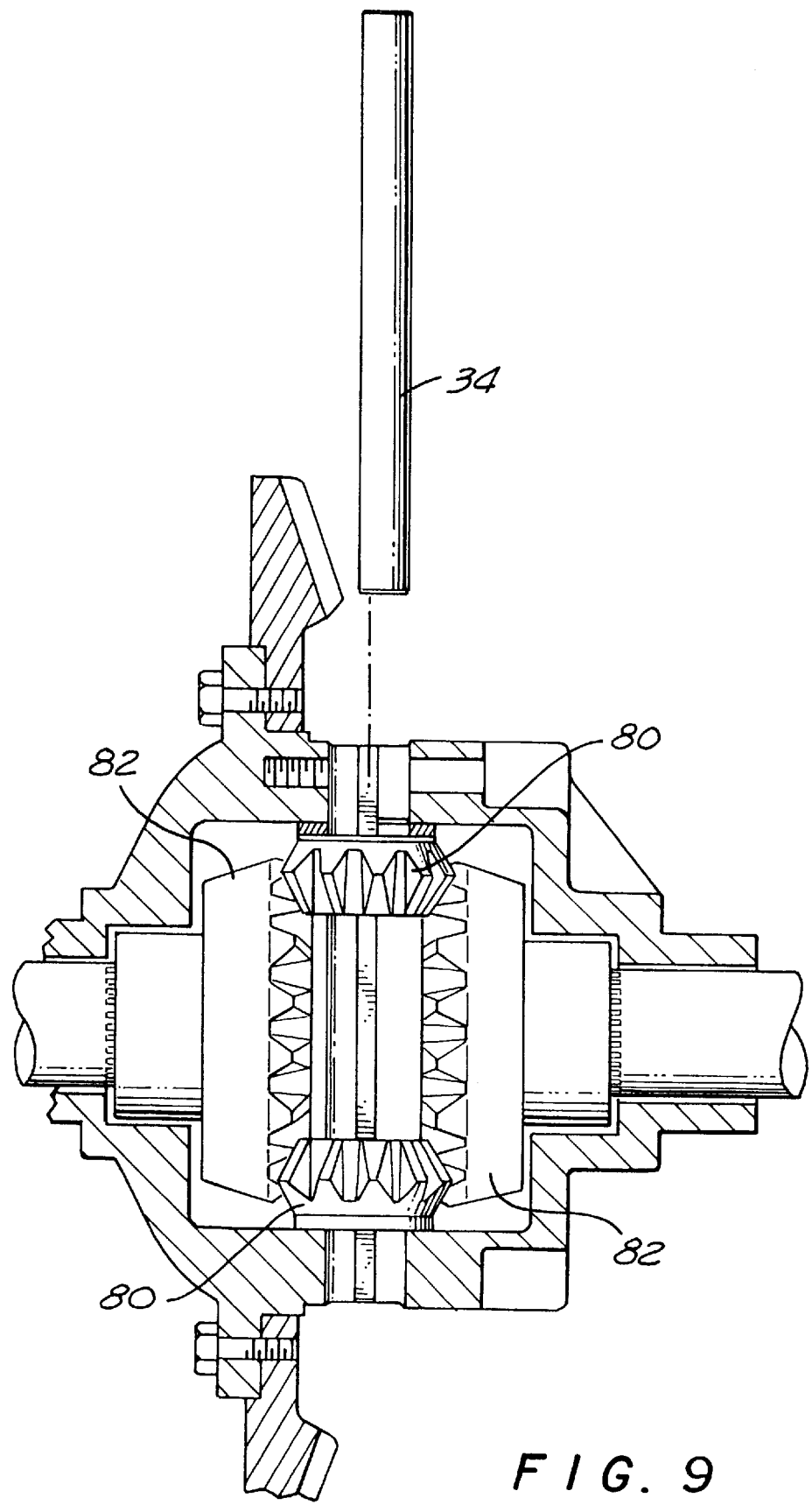
FIG. 9 is a view similar to FIG. 4, though illustrating the present invention as used in an open differential.

The present invention has been described herein, for purposes of illustration and explanation only, primarily with respect to a specific form of locking differential. It is to be understood, however that the present invention is also advantageously usable with respect to other types of differentials, such as conventional (open) differentials, limited slip differentials and other types of differentials and other types of locking differentials. In open and limited slip differentials, as illustrated in FIG. 9, spider gears 80 are to be supported on the two part pinion, the spider gears driving side gears 82 supported on the ends of the drive axles. The two part pinion pin is advantageous in such applications, as once installed, the two part pinion pin can be removed at any time without disassembly of the case from the housing and removal of the ring gear, allowing easy servicing and/or replacement of any of the internal gears.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A differential assembly, comprising:

a case that has an inner cavity;

an outer ring gear attached to said case;

a coupler member located within said inner cavity of said case;

a drive member that is coupled to said coupler member; and, a two part pinion pin;

said two part pinion pin beina split along its lenath into a first part and a second part;

said two part pinion pin coupling said drive member to said case.

2. The assembly as recited in claim 1, wherein said first part includes a tongue that extends into a groove of said second part.

3. The assembly as recited in claim 1, further comprising a fastener that attaches said two part pinion pin to said case.

4. The assembly as recited in claim 1, further comprising a spacer that aligns said drive member with said coupler member.

5. The assembly as recited in claim 1, further comprising a spring that biases said drive member toward said coupler member.

6. The assembly as recited in claim 1, wherein said drive member includes a groove that receives said two part pinion pin.

7. The assembly as recited in claim 1, wherein the width of said groove is greater than a diameter of said two part pinion pin.

8. A differential assembly for a vehicle which has a pair of wheel axles and a drive shaft, comprising:

a case;

an outer ring gear that is attached to said case and adapted to be coupled to the drive shaft;

a pair of coupler members adapted to be attached to the wheel axles;

a pair of drive members that are coupled to said coupler members; and, a two part pinion pin;

said two part pinion pin being split along its length into a first dart and a second part;

said two part pinion pin coupling said drive members to said case.

9. The assembly as recited in claim 7, wherein said first part includes a tongue that extends into a groove of said second part.

10. The assembly as recited in claim 8 further comprising a fastener that attaches said two part pinion pin to said case.

11. The assembly as recited in claim 8, further comprising a pair of spacers that align said drive members to said coupler members.

12. The assembly as recited in claim 8, further comprising a plurality of springs that bias said drive members toward said coupler members.

13. The assembly as recited in claim wherein each drive member includes a groove that receives said two part pinion pin.

14. The assembly as recited in clai wherein the width of said groove is greater than a diameter of said two part pinion pin.

15. A method for assembling a drive member into a differential assembly which includes a ring gear that is attached to a case that has an inner cavity and a bore, the differential member assembly further having coupler member that is attached to a wheel axle, comprising the steps of:

a) inserting a drive member into the inner cavity so that the drive member is coupled to the coupler member;

b) inserting a first part of a two part pinion pin into the bore;

c) inserting a second part of the two part pinion pin into the bore to couple the drive member to the case;

wherein the first part and the second part form the two part pinion pin which is split alona its length.

16. The method as recited in claim 15, further comprising the step of rotating the first part before step (c).

17. The method as recited in claim 15, further comprising the step of fastening the first and second parts of the two part pinion pin to the case.

18. The method as recited in claim 15, further comprising the step of inserting a spacer into the inner cavity and onto the coupler member before step (b), wherein the spacer aligns the drive member with the coupler member.

19. A differential, comprising:

a differential case having an inner cavity containing a differential assembly, the differential case being supported for rotation about a first axis, the differential case having a pinion pin bore with a second axis substantially perpendicular to the first axis;

a two part pinion pin within said pinion pin bore coupling the differential assembly within said differential case to the differential case for rotation about said first axis;

a ring gear attached to said differential case, said ring gear extending to adjacent the ends of said pinion pin bore so as to interfere with the insertion and removal of a solid pinion pin in said pinion pin bore;

said two part pinion pin being split along its length into first and second pinion pin parts;

said first and second pinion pin parts being insertable into and removable from said pinion pin bore without detaching said ring gear from said differential case.

20. The differential of claim 19 wherein said first part of said two part pinion pin includes a tongue that extends into a groove in said second part.

21. The differential of claim 19 wherein said differential assembly within said differential case is an open differential assembly.

22. The differential of claim 19 wherein said differential assembly within said differential case is a locking differential assembly.

* * * * *